United States Patent
Asgekar et al.

(10) Patent No.: US 12,131,667 B2
(45) Date of Patent: Oct. 29, 2024

(54) SYSTEMS AND METHODS FOR DEEPLY INTEGRATED PRESENTATION GADGETS

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

(*) Notice: Subject to any disclaimer, the term of this patent is extended or adjusted under 35 U.S.C. 154(b) by 275 days.

(21) Appl. No.: 17/523,842

(22) Filed: Nov. 10, 2021

(65) Prior Publication Data
US 2023/0140974 A1    May 11, 2023

(51) Int. Cl.
| | |
|---|---|
| G06F 40/103 | (2020.01) |
| G09B 5/12 | (2006.01) |
| G09B 7/02 | (2006.01) |
| H04L 67/04 | (2022.01) |

(52) U.S. Cl.
CPC ............. G09B 5/12 (2013.01); G06F 40/103 (2020.01); G09B 7/02 (2013.01); H04L 67/04 (2013.01)

(58) Field of Classification Search
CPC ...... G06F 40/103; G06F 9/451; G06F 40/106; G06F 40/186; G09B 5/12; G09B 7/02; H04L 67/04
See application file for complete search history.

(56) References Cited

U.S. PATENT DOCUMENTS

| | | | | |
|---|---|---|---|---|
| 7,818,668 | B2* | 10/2010 | Michelstein | G06F 40/143 715/249 |
| 8,972,854 | B2* | 3/2015 | Miller | G06F 40/154 715/255 |
| 9,953,009 | B1* | 4/2018 | Behar | G06F 40/186 |
| 10,037,375 | B2* | 7/2018 | Ben-Tzur | G06F 16/9566 |
| 2007/0288858 | A1* | 12/2007 | Pereira | G06F 9/451 715/764 |
| 2018/0203674 | A1* | 7/2018 | Dayanandan | G06F 8/35 |
| 2021/0064203 | A1* | 3/2021 | Yue | G06N 20/00 |
| 2021/0073330 | A1* | 3/2021 | Inagaki | G06F 40/30 |
| 2022/0012406 | A1* | 1/2022 | D'Oria | G06V 30/10 |
| 2022/0374249 | A1* | 11/2022 | Nair | G06Q 10/10 |

* cited by examiner

*Primary Examiner* — Wilson W Tsui
(74) *Attorney, Agent, or Firm* — Volpe Koenig

(57) ABSTRACT

The present disclosure provides systems and methods for generating deeply integrated presentation gadgets. A system can maintain a plurality of application interfaces each having one or more data fields for presenting content. The system can maintain an information resource having data objects. Each of the data objects can have a content attribute. The system can extract each data object from the information resource based on the respective content attribute. The system can generate a presentation data structure having fields for the information resource based on the extracted data objects. The system can select an application interface for presentation with the information resource. The application interface can populate the one or more data fields of the application interface. The system can present the application interface with the information resource at a client device based on the one or more data fields of the application interface.

17 Claims, 7 Drawing Sheets

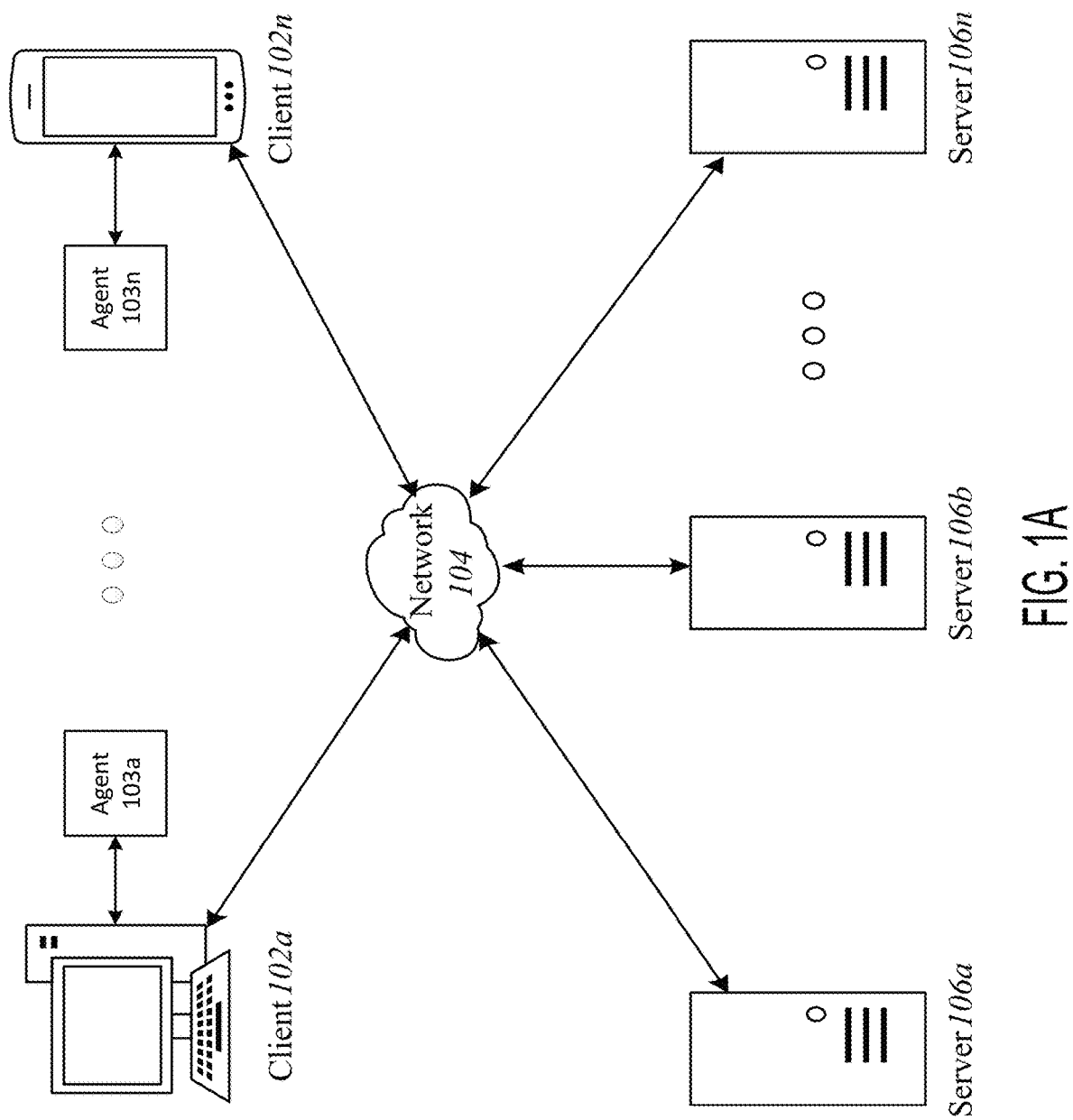

SYSTEMS AND METHODS FOR DEEPLY INTEGRATED PRESENTATION GADGETS

BACKGROUND

Educators typically create and format teaching media as part of a lesson plan. It can be challenging to efficiently create media content in multiple different formats that is localized or targeted for various teaching environments and contexts.

SUMMARY

Conventionally, educators manually create and format teaching media for students. In some cases, content can be presented in connection with interactive elements, which can take the form of additional application interfaces. Such interfaces can include, for example, calculators, viewers for three-dimensional chemical formulas, or graphing interfaces, among others. In conventional systems, teachers must manually create, format, and configure an application for use with teaching media. Often, teaching media is not compatible with existing application interfaces, which can make integration of existing content potentially tedious, inconsistent, or simply impossible. Thus, it would be advantageous to a system to automatically analyze teaching content and integrate the teaching content with interactive application interfaces, or gadgets.

The systems and methods of the present disclosure solve this and other issues by providing techniques for integrating teaching media with integrated gadgets. At least one aspect of the present disclosure is directed to a method. The method can be performed, for example, by one or more processors coupled to memory. The method can include maintaining a plurality of application interfaces each having one or more data fields for presenting content. The method can include maintaining an information resource comprising a plurality of data objects. Each of the plurality of data objects can have a content attribute. The method can include extracting each data object of the plurality of data objects from the information resource based on the content attribute of the data object. The method can include generating a presentation data structure for the information resource based on the plurality of data objects extracted from the information resource. The presentation data structure can include one or more fields. The method can include selecting, based on the presentation data structure, an application interface from the plurality of application interfaces for presentation with the information resource. The application interface can parse the one or more fields of the presentation data structure and populate the one or more data fields of the application interface. The method can include presenting the application interface with the information resource at a client device based on the one or more data fields of the application interface.

In some implementations, maintaining the information resource can include receiving, from a provider computing device, the information resource. In some implementations, maintaining the information resource can include storing the information resource in a database for retrieval. In some implementations, the method can include receiving, from a provider device, a constraint for the one or more data fields of the application interface. In some implementations, presenting the application interface with the information resource at the client device is further based on the constraint received from the provider device. In some implementations, extracting each data object of the plurality of data objects from the information resource can include providing the plurality of data objects as input to a transformer model. In some implementations, extracting each data object of the plurality of data objects from the information resource can include determining a tag for each data object of the plurality of data objects based on an output from the transformer model.

In some implementations, generating the presentation data structure for the information resource can include selecting a field type for a data object of the plurality of data objects based on the tag associated with the data object. In some implementations, generating the presentation data structure for the information resource can include generating the presentation data structure to include a field having the field type in the one or more fields of the presentation data structure. In some implementations, generating the presentation data structure for the information resource can include populating the field having the field type based on the data object of the plurality of data objects. In some implementations, determining the tag for each data object of the plurality of data objects can include transmitting the tag for the data object to a provider device. In some implementations, determining the tag for each data object of the plurality of data objects can include receiving, from the provider device, a selection of an updated tag. In some implementations, determining the tag for each data object of the plurality of data objects can include replacing the tag for the data object with the updated tag received from the provider device.

In some implementations, the method can include updating the transformer model based on the selection of the updated tag received from the provider device. In some implementations, selecting the application interface of the plurality of application interfaces can include receiving a selection of a data object of the information resource from the client device presenting the information resource. In some implementations, selecting the application interface of the plurality of application interfaces can include selecting the application interface based on the one or more fields in the presentation data structure associated with the data object. In some implementations, selecting the application interface of the plurality of application interfaces can include receiving a selection of the application interface from a provider device. In some implementations, the selection can indicate a request to present the application interface with the information resource.

In some implementations, presenting the application interface with the information resource at the client device can include presenting the information resource at the client device in response to a request for the information resource, wherein the information resource comprises an actionable object. In some implementations, presenting the application interface with the information resource at the client device can include detecting an interaction with the actionable object presented as part of the information resource. In some implementations, presenting the application interface with the information resource at the client device can include presenting the application interface in response to the interaction with the actionable object.

At least one other aspect is directed to a system. The system can include one or more processors coupled to memory. The system can maintain a plurality of application interfaces each having one or more data fields for presenting content. The system can maintain an information resource comprising a plurality of data objects. Each of the plurality of data objects having a content attribute. The system can extract each data object of the plurality of data objects from the information resource based on the content attribute of the data object. The system can generate a presentation data structure for the information resource based on the plurality of data objects extracted from the information resource. The presentation data structure can include one or more fields. The system can select, based on the presentation data structure, an application interface from the plurality of application interfaces for presentation with the information resource. The application interface can parse the one or more fields of the presentation data structure and populate the one or more data fields of the application interface. The system can present the application interface with the information resource at a client device based on the one or more data fields of the application interface.

In some implementations, the system can maintain the information resource by receiving, from a provider computing device, the information resource. In some implementations, the system can maintain the information resource by storing the information resource in a database for retrieval. In some implementations, the system can receive, from a provider device, a constraint for the one or more data fields of the application interface. In some implementations, the system can present the application interface with the information resource at the client device further based on the constraint received from the provider device. In some implementations, the system can extract each data object of the plurality of data objects from the information resource by providing the plurality of data objects as input to a transformer model. In some implementations, the system can extract each data object of the plurality of data objects from the information resource by determining a tag for each data object of the plurality of data objects based on an output from the transformer model.

In some implementations, the system can generate the presentation data structure for the information resource by selecting a field type for a data object of the plurality of data objects based on the tag associated with the data object. In some implementations, the system can generate the presentation data structure for the information resource by generating the presentation data structure to include a field having the field type in the one or more fields of the presentation data structure. In some implementations, the system can generate the presentation data structure for the information resource by populating the field having the field type based on the data object of the plurality of data objects. In some implementations, the system can determine the tag for each data object of the plurality of data objects by transmitting the tag for the data object to a provider device. In some implementations, the system can determine the tag for each data object of the plurality of data objects by receiving, from the provider device, a selection of an updated tag. In some implementations, the system can determine the tag for each data object of the plurality of data objects by replacing the tag for the data object with the updated tag received from the provider device.

In some implementations, the system can update the transformer model based on the selection of the updated tag received from the provider device. In some implementations, the system can select the application interface of the plurality of application interfaces by receiving a selection of a data object of the information resource from the client device presenting the information resource. In some implementations, the system can select the application interface of the plurality of application interfaces by selecting the application interface based on the one or more fields in the presentation data structure associated with the data object.

In some implementations, the system can select the application interface of the plurality of application interfaces by receiving a selection of the application interface from a provider device, the selection indicating a request to present the application interface with the information resource. In some implementations, the system can present the application interface with the information resource at the client device by presenting the information resource at the client device in response to a request for the information resource, wherein the information resource comprises an actionable object. In some implementations, the system can present the application interface with the information resource at the client device by detecting an interaction with the actionable object presented as part of the information resource. In some implementations, the system can present the application interface with the information resource at the client device by presenting the application interface in response to the interaction with the actionable object.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

DETAILED DESCRIPTION

Figure 1B:
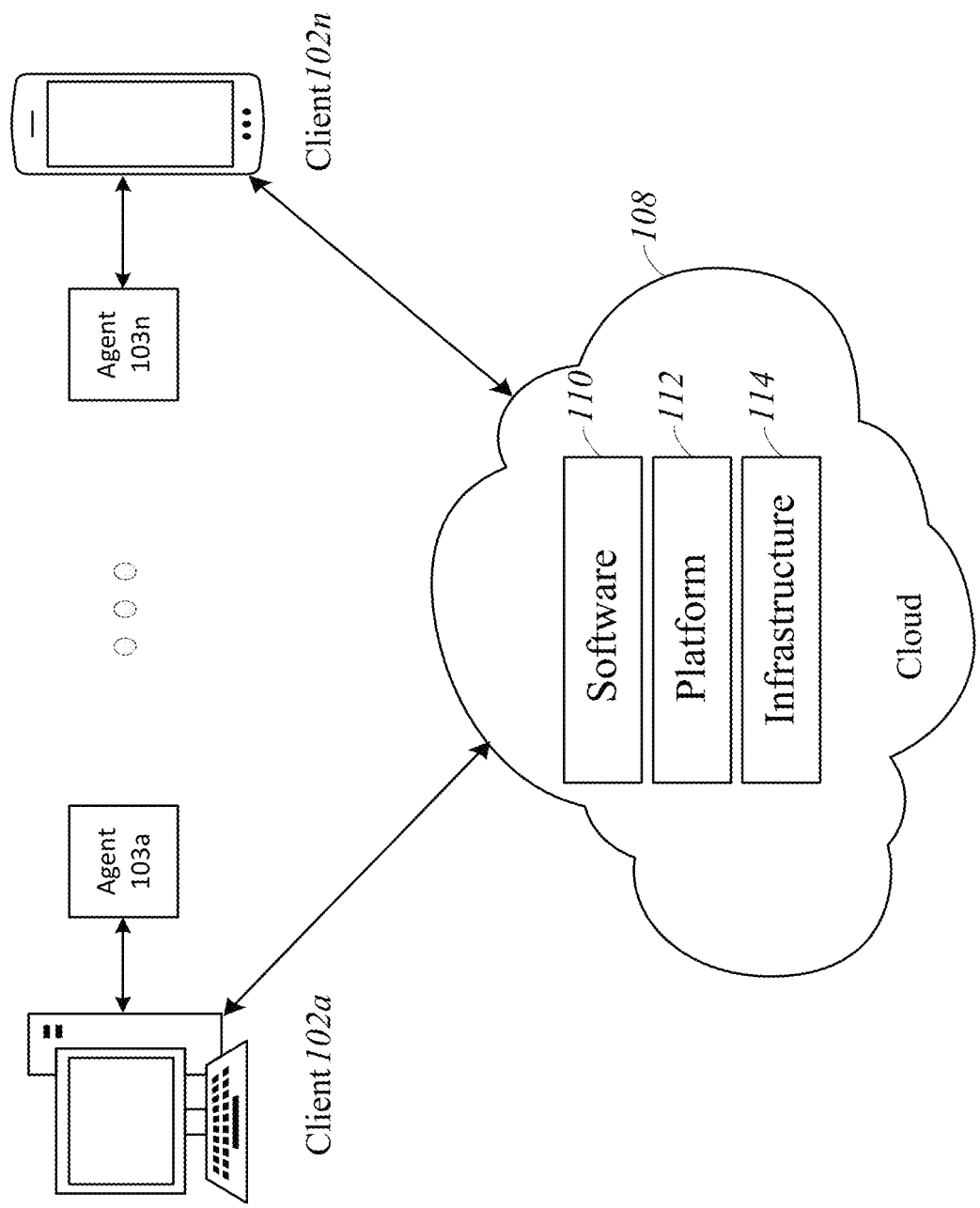
FIG. 1B is a block diagram depicting a cloud computing environment comprising a client device in communication with cloud service providers.

Below are detailed descriptions of various concepts related to, and implementations of, techniques, approaches, methods, apparatuses, and systems for generating deeply integrated presentation gadgets. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful.

Section A describes a network environment and computing environment which may be useful for practicing embodiments described herein; and Section B describes systems and methods for generating deeply integrated presentation gadgets.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer.

Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
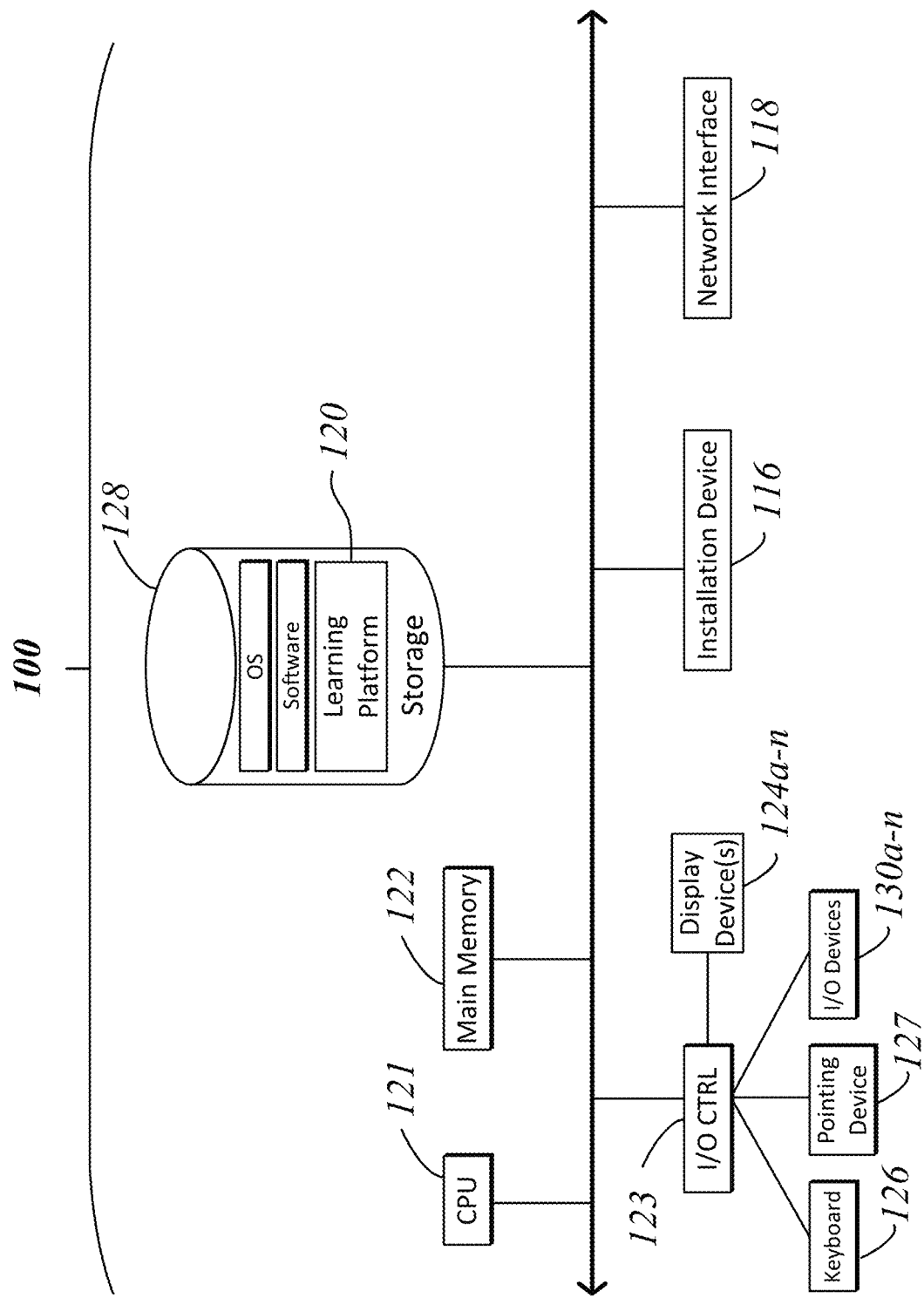
FIGS. 1C and 1D are block diagrams depicting embodiments of computing devices useful in connection with the methods and systems described herein.
Figure 1D:
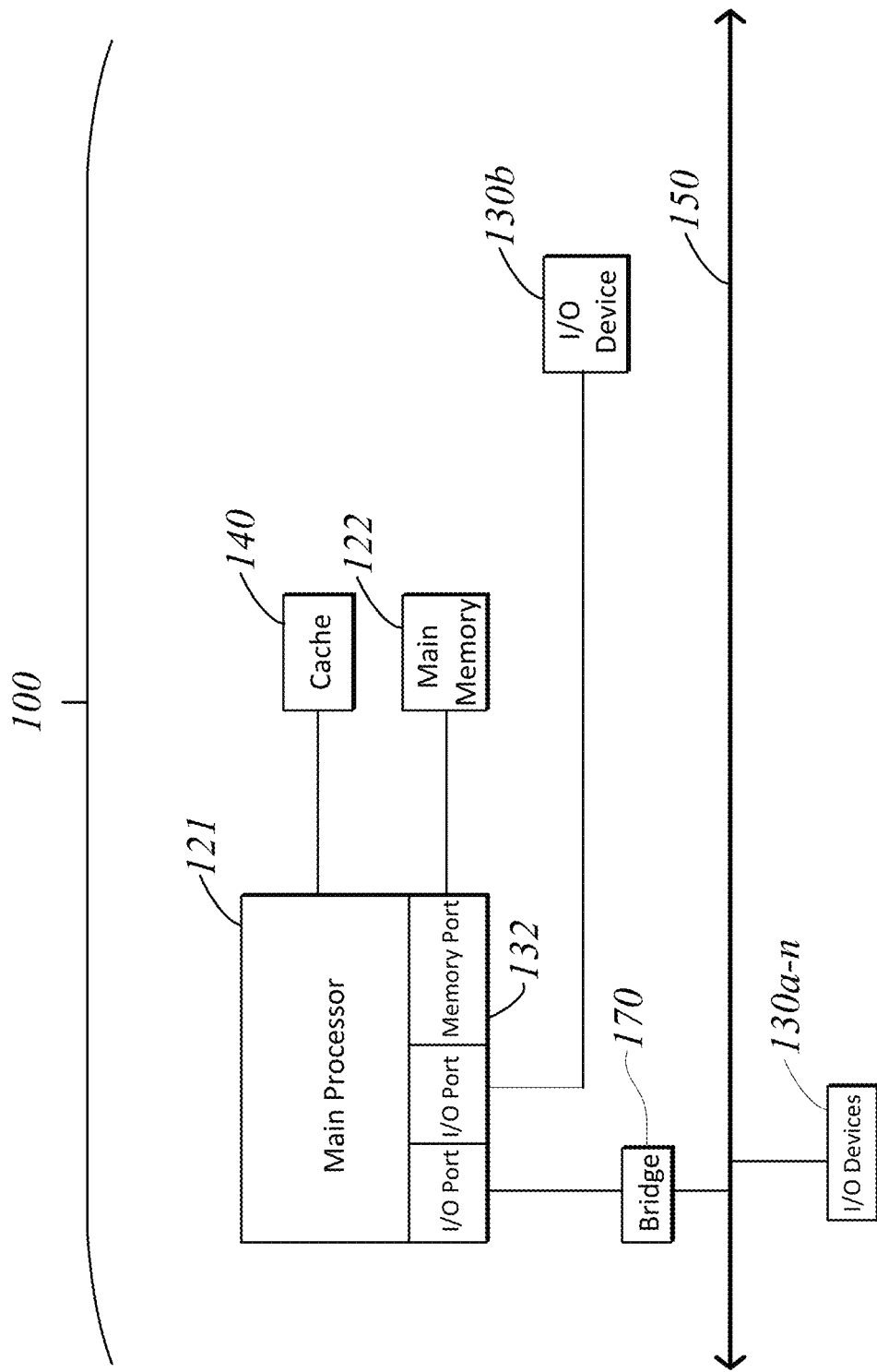

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via a I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Generating Deeply Integrated Presentation Gadgets

Teaching is bogged down by numerous logistical tasks. Among these tasks is selecting tools, such as interactive applications, for lessons and configuring those applications to enable visual and interactive teaching. As described herein above, conventionally, educators manually create and format teaching media for students. In some cases, content can be presented in connection with interactive elements, which can take the form of additional application interfaces. Such interfaces can include, for example, calculators, viewers for three-dimensional chemical formulas, or graphing interfaces, among others. In conventional systems, teachers must manually create, format, and configure an application for use with teaching media. Often, teaching media is not compatible with existing application interfaces, which can make integration of existing content potentially tedious, inconsistent, or simply impossible. Further, it can be challenging to select and populate appropriate interactive teaching applications such as calculators, spreadsheets, tables, or simulations. Thus, it would be advantageous to a system to automatically analyze teaching content and integrate the teaching content with interactive application interfaces, or gadgets.

The systems and methods of the present disclosure solve this and other issues by providing techniques for integrating teaching media with integrated gadgets. The systems and methods of this technical solution can automatically select and populate information fields for interactive teaching applications (sometimes referred to herein as "gadgets"), such as calculators, spreadsheets, tables, or simulations, among others, based on contextual cues from digital documents and teaching media. To do so, the systems and methods described herein can analyze teaching media to determine a semantic understanding of the content. The systems and methods of this technical solution can automatically suggest the optimal tool for a given type of teaching media, such as a question, and insert the relevant information for the tool based on contextual information. For example, the equation of an algebraic word problem could be inserted in a graphing gadget with a single click, or a three-dimensional (3D) model of a molecular structure can be generated automatically, or a verb conjugation table for a foreign language passage cam be pre-loaded and presented with the words on a page in response to an interaction.

The systems and methods described herein can accomplish this using a custom markup language for gadget interaction, a parser that turns gadget markup into common code for integration with existing tools, and a markup engine that uses semantic understanding to suggest appropriate markup for items on an information resource. The markup language can be used for storing and communicating metadata embedded at an object level for media content. The markup language can wrap any fields in content and corresponding providers as implemented by the presentation gadgets that will allow the gadgets to parse and process these inputs. Example markup language for plotting a parametric equation of a circle with a radius of 3 in a space from −10 to 10 is included below.

```
<entity>
    <data>
        <field id = "x">
            3*sin(t)
        </field>
        <field id = "y">
            3*cos(t)
        </field>
```

-continued

```
    </data>
    <capabilities>
        <type name="plot" parameters="field">
        </type>
        <subtype name="parametric">
    </capabilities>
    <constraints>
        <field id = "x">
            −10,10
        </field>
        <field id = "y">
            −10,10
        </field>
    </constraints>
</entity>
```

The above data populating the fields and constraints for the entity can be extracted from media content and a query will be generated over all possible gadgets (e.g., maintained in a gadget library, etc.) that satisfy the capabilities as defined in the entity. Each gadget can be indexed based on its list of capabilities, which can be stored in association with the gadget in the gadget library. Each gadget can also be stored in association with a map from the data fields to an internal representation for use with the gadget. Once retrieved, the corresponding fields from <data> can then be loaded into (e.g., populated, etc.) the presentation gadget, allowing the user to interact with the gadget when viewing the corresponding media content. The constraints defined within the entity can be defined by an educator or another educational content provider, and can be used to define rendering parameters of the gadget. For example, graphing gadgets can include constraints for an XY plane. For chemistry gadgets, the constraints can include elements shown in a periodic table, or in case of physics simulation gadgets, the constraints can be values of important variables, such as gravitational acceleration.

The systems and methods described herein can annotate media content with corresponding markup tags for extraction during content generation or content provision (e.g., when the system receives content, or when the content is provided to a user for viewing, etc.). To assist in discovery and training for annotating content, information from the media content can be automatically extracted and labeled with appropriate tags while providing educators or educational content providers the ability to override these tags during content creation (e.g., content upload, etc.). The training data for these tags can be used as part of an existing corpus of annotated tags, which can be augmented with semi-supervised extracted data using entity extraction techniques. The systems and methods described herein can use a transformer model with multiple softmax layered heads, which can be trained over the training data described herein above. The first softmax layer can output the "type" of the data. This information, along with the media content, can be provided as input to the second layer of transformers that will then generate the "subtype", "fields", and "constraints", among others.

Thus, the systems and methods described herein can automatically suggest an appropriate presentation gadget to visualize a piece of educational content, or answer a question. In addition, the systems and methods described herein can automatically configure the presentation gadgets based on a semantic understanding of selected content. The semantic understanding can be processed, for example, using a transformer model as described herein. The interactive gadgets can be embedded in and presented with the teaching media content automatically, thereby automatically enhancing the teaching media.

Figure 2:
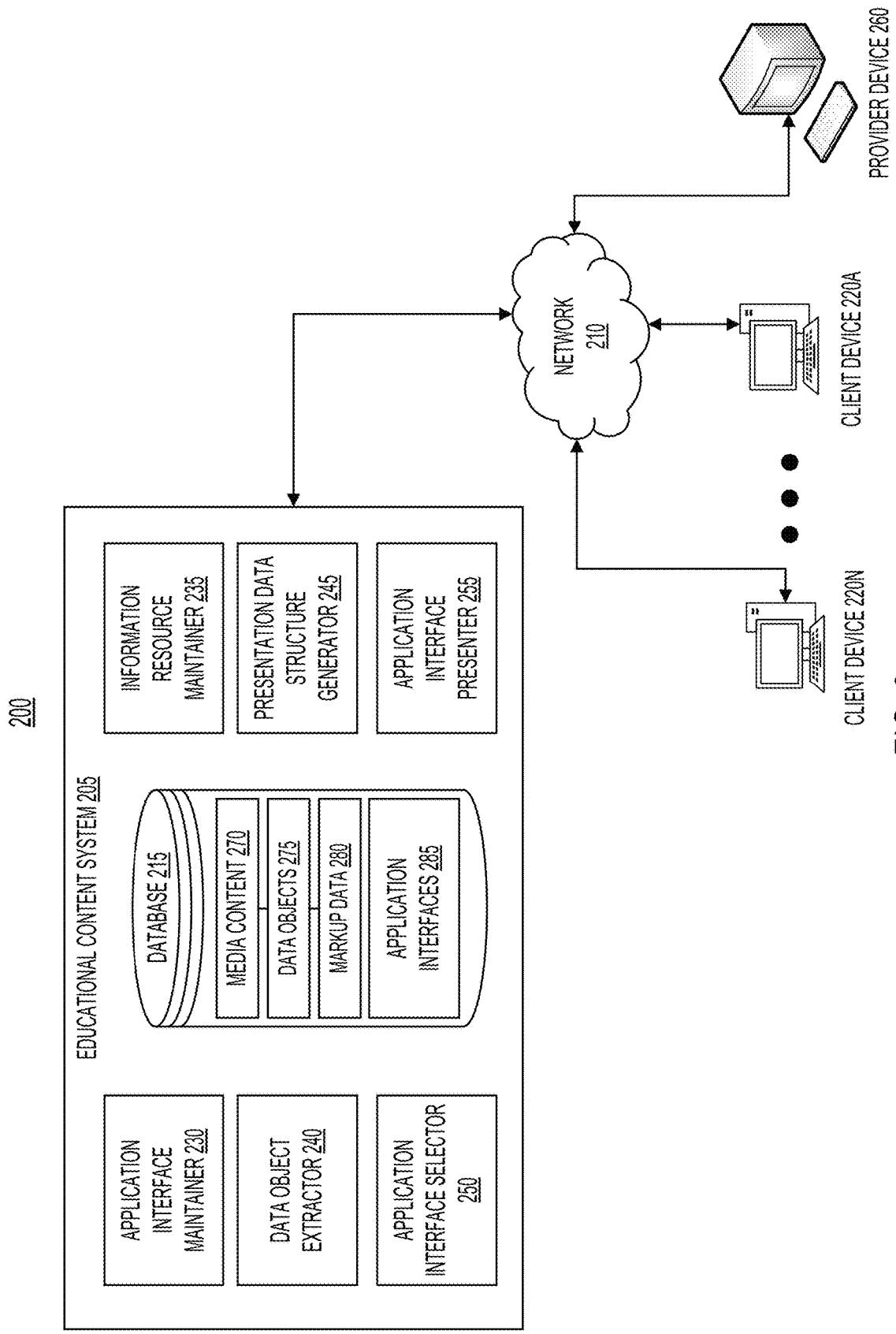
FIG. 2 is a block diagram of an example system for generating deeply integrated presentation gadgets, in accordance with one or more implementations.

Referring now to FIG. 2, illustrated is a block diagram of an example system 200 for generating deeply integrated presentation gadgets, in accordance with one or more implementations. The system 200 can include at least one educational content system 205, at least one network 210, one or more client devices 220A-220N (sometimes generally referred to as client device(s) 220), and at least one provider device 260. The educational content system 205 can include at least one application interface maintainer 230, at least one information resource maintainer 235, at least one data object extractor 240, at least one presentation data structure generator 245, at least one application interface selector 250, at least one application interface presenter 255, and at least one database. The database 215 can include media content 270, one or more data objects 275, markup data 280, and one or more application interfaces 285. In some implementations, the database 215 can be external to the educational content system 205, for example, as a part of a cloud computing system or an external computing device in communication with the devices (e.g., the educational content system 205, the client devices 220, the provider device 260, etc.) of the system 200 via the network 210.

Each of the components (e.g., the educational content system 205, the network 210, the client devices 220, the provider device 260, the application interface maintainer 230, the information resource maintainer 235, the data object extractor 240, the presentation data structure generator 245, the application interface selector 250, the application interface presenter 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the educational content system 205 can perform any of the functionalities detailed herein.

The educational content system 205 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The educational content system 205 can include one or more computing devices or servers that can perform various functions as described herein. The educational content system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, or any combinations thereof. The educational content system 205 of the system 200 can communicate via the network 210, for example, with one or more client devices 220, or with the provider device 260. The network 210 may be any form of computer network that can relay information between the educational content system 205, the one or more client devices 220, the provider device 260, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the educational content system 205, the one or more client devices 220, the provider device 260, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the educational content system 205, the one or more client devices 220, the provider device 260, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a television device, a mobile device, smart phone, personal computer, a laptop, a gaming device, a kiosk, or any other type of computing device. Each client device 220 can be implemented using hardware or a combination of software and hardware. Each client device 220 can include a display device that can provide visual information, such as information presented as a result of executing instructions stored in the memory of the client device 220. The display device can include a liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as a capacitive or resistive touch sensors. Thus, the display device can be an interactive display (e.g., a touchscreen, a display, etc.), and can include one or more input/output (I/O) devices or interfaces. Each client device 220 can further include or be in communication with (e.g., via a communications bus coupled to the processors of the client devices 220, etc.) one or more input devices, such as a mouse, a keyboard, or digital keypad, among others.

The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 220. The interactions can result in interaction data, which can be stored and transmitted by the processing circuitry of the client device 220 to other computing devices, such as those in communication with the client devices 220. The interaction data can include, for example, interaction coordinates, an interaction type (e.g., click, swipe, scroll, tap, etc.), and an indication of an actionable object with which the interaction occurred. Thus, each client device 220 can enable a user to interact with and/or select one or more actionable objects presented as part of graphical user interfaces to carry out various functionalities as described herein.

The client devices 220 can each execute one or more client applications, which can include a web browser or native application that presents educational content (e.g., the media content 270, the application interfaces 285, etc.) provided by the educational content system 205. The one or more client applications can cause the display device of one or more client devices 220 to present a user interface that includes educational content, such as presentation slides, word documents, online questions, or electronic textbooks, among others. The application can be a web application (e.g., provided by the educational content system 205 via the network 210, etc.), a native application, an operating system resource, or some other form of executable instructions. In some implementations, the client application can include a local application (e.g., local to a client device 220), hosted application, Software as a Service (SaaS) application, virtual application, mobile application, and other forms of content. In some implementations, the application can include or correspond to applications provided by remote servers or third party servers. In some implementations, the application can access the information resources 280 maintained by the database 215, and generate a user interface that displays one or more of the information resources 280 on the display device of the client device 220 on which the client application is executing. In some implementations, the user interface can include one or more actionable objects that correspond to multiple choice question answers presented as part of the media content 270. In some implementations, the actionable object can be a "fill-in-the-blank" box that can accept user input, and transmit the input to the educational content system 205 for storage or further processing. Such actionable objects can include user-selectable hyperlinks, buttons, graphics, videos, images, or other application features that generate a signal that is processed by the application executing on the respective client device 220.

In some implementations, one or more client devices 220 can establish one or more communication sessions with the educational content system 205. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access the information resources 280, such as web pages via a web browser, or application resources via a native application executing on a client device 220. When accessing the information resources 280, the client device 220 can execute instructions (e.g., embedded in the native applications, or a script in the information resources 280, etc.) that cause the client devices to display educational content, which can include images, video, audio, quiz or exam questions, practice questions, or other types of educational content. As described herein, the client device 220 can transmit one or more requests for educational content to the educational content system 205, and can receive one or more responses that include the requested content. An educational content request can include, for example, a request for a lesson, a request for a question, a request for an information resource related to a topic, or a request for information specified in a query, among others.

In response to interactions with the various user interface elements, the client devices 220 can transmit information, such as account information (e.g., changing account parameters, changing login information, etc.), interaction information, selections of question answers, provided answers to questions, selections of topics, categories, or lesson-based information, or other signals to the educational content system 205. Generally, the client devices 220 can request and display educational content (e.g., the media content 270, the application interfaces 285, etc.) received from the educational content system 205. The requests can include, for example, requests to access information from an educational lesson provided by the provider device 260, or information related to one or more queries provided by the client devices 220. The request can be a hypertext transfer protocol (HTTP or HTTPS) request message, a file transfer protocol message, an email message, a text message, or any other type of message that can be transmitted via the network 210.

The provider device 260 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The provider device 260 can include one or more computing devices or servers that can perform various functions as described herein. The provider device 260 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

The provider device 260 can be substantially similar to one or more of the client devices 220 described herein above, and can include any of the hardware components of the client devices 220, as well as perform any of the functionalities of the client devices 220 as described herein. In addition, the provider device 260 can communicate with the educational content system 205 to provide one or more items of media content 270. As described herein, the media content 270 can sometimes be referred to, or can be included in, an information resource. The provider device 260 can be operated by one or more educators or educational content creators, and can provide the media content 270 to the educational content system 205 via the network 210. The media content 270 can also be provided to the educational content system 205 from a content source (not pictured) via the network 210. In some implementations, the provider device 260 can provide the media content 270 to the educational content system 205 in a request to add an item of the media content 270 to the database 215.

In some implementations, the provider device 260 can provide the media content 270 to the educational content system 205 in a request to integrate one or more application interfaces 285 with an item of the media content 270. A request to integrate one or more application interfaces 285 with an item of the media content 270 can specify an entity in the identified item of media content 270. In some implementations, the request to integrate one or more application interfaces 285 with an item of the media content 270 can further specify an identifier of an application interface 285, which the educational content system 205 can use to integrate the application interface 285 with the media content 270. In some implementations, the educational content system 205 can automatically select an application interface 285 to integrate with the specified item of media content 270.

In some implementations, the provider device 260 can execute one or more applications, such as a web browser or a native application, which presents a user interface that allows a user (e.g., an educator or an educational content provider, etc.) to transmit media content 270 to the educational content system 205. The user interface can further include features that allow a user to select or otherwise specify an application interface 285 for integration with the media content 270 to replace. For example, in some implementations, the provider device 260 can access the media content 270 maintained by the educational content system 205, causing the educational content system 205 to transmit a selected item of media content 270 for display in the user interface of the provider device 260. In some implementations, the provider device 260 can transmit a request for a list of candidate application interfaces 285 to the educational content system 205, which can transmit a response message including the candidate list of application interfaces 285 to the provider device 260 for display (e.g., in the user interface as one or more actionable objects, etc.). A user of the provider device 260 can make a selection from the list of candidate replacement entities, causing the provider device 260 to transmit a message to the educational content system 205 specifying one or more application interfaces 285 to integrate with the item of media content 270.

In some implementations, the application interface 285 integration request can include a selection of one or more items of the media content 270 maintained by the educational content system 205, such that the request specifies that the specified application interface 285 should be integrated in the one or more selected items of the media content 270. To select an item of media content 270, the provider device 260 can transmit one or more queries to the educational content system 205 that can request media content 270 related to a topic, category, or set of keywords provided in the one or more queries. The educational content system 205 can transmit a list of the media content 270 relating to the queries to the provider device 260, from which the provider device 260 can make selections regarding the integration of application interfaces 285 by transmitting application interface integration requests. For example, the entity replacement request can specify one or more items of media content 270, one or more entities in the items of media content 270 to replace (e.g., a portion of text content, an image, video, or audio content, etc.), and can specify one or more respective entities that are to replace the one or more specified entities.

The user interfaces presented on the display device of the provider device 260 can provide a user with access to each of the media content 270, the data objects 275, the markup data 280, and the application interfaces 285. In some implementations, the provider device 260 can access only the media content 270, the data objects 275, the markup data 280, and the application interfaces 285, which the provider device 260 is authorized to access. For example, the provider device 260 can access the functionality of the educational content system 205 by first entering login credentials or other identification information that identifies an account of the provider device 260 that is maintained by the educational content system 205. The account can be associated with certain media content 270, data objects 275, markup data 280, and application interfaces 285, and which can then be accessed (e.g., requested, displayed, modified, transmitted, deleted, created, etc.) by the provider device 260 in response to the authentication credentials.

The database 215 can be a computer-readable memory that can store or maintain any of the information described herein. The database 215 can maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the educational content system 205, or any other computing device described herein, such as the client devices 220 or the provider device 260, via the network 210. In some implementations, the database 215 can be internal to the educational content system 205. In some implementations, the database 215 can exist external to the educational content system 205, and may be accessed via the network 210. The database 215 can be distributed across many different computer systems or storage elements, and may be accessed via the network 210 or a suitable computer bus interface. The educational content system 205 (or the components thereof) can store, in one or more regions of the memory of the educational content system 205, or in the database 215, the results of any or all computations, determinations, selections, identifications, generations, constructions, or calculations in one or more data structures indexed or identified with appropriate values. Any or all values stored in the database 215 may be accessed by any computing device described herein, such as the educational content system 205, to perform any of the functionalities or functions described herein. In some implementations, the database 215 can be similar to or include the storage 128 described herein above in conjunction with FIG. 1C. In some implementations, instead of being internal to the educational content system 205, the database 215 can be a distributed storage medium in a cloud computing system, such as the cloud 108 detailed herein in connection with FIG. 1B.

The database 215 can store media content 270, for example, in one or more data structures. The media content 270 can be provided to the educational content system 205 by the provider device 260 as described herein. In some implementations, the media content 270 can be stored in association with an identifier (e.g., an authentication credential, a username, etc.) of the user that provided the media content 270. In some implementations, the media content 270 be, or form a part of, one or more information resources. The media content 270 can include any form of educational media, such as text, images, video, audio, or instructions to display images, video, or text in an information resource. The media content 270 can be stored in association with one or more tags, topics, or category identifiers that indicate the type of information provided by the media content 270. The media content 270 can be stored as individual content items in one or more data structures, and can be stored in association with a timestamp corresponding to the time the item of media content 270 was stored in the database 215. The media content 270 can have various presentation attributes. For example, images can include presentation attributes such as image height, image width, image format (e.g., BMP, PNG, JPEG, SVG, etc.), image bit-depth, and other image attributes. Presentation attributes for videos can include video duration, video codec, sound codec, and video resolution (e.g., width, height, etc.), closed captioning information (e.g., text content, etc.), among others. Presentation attributes for text can include font type-face, font size, text location, text formatting information, and other information. In some implementations, an item of media content 270 can include an identifier to a different item of media content 270. For example, an item of media content 270 can include instructions that cause the item of media content 270 to be presented on an information resource with a second item of media content 270. In some implementations, the presentation attributes of the item of media content 270 can specify a relative position of the item of content to the second item of media content 270 when presented on an information resource. In some implementations, an item of media content 270 is an information resource 270, and the presentation attributes can specify a position of the second item of media content 270 when the item of media content 270 is displayed (e.g., as an information resource).

The database 215 can store or maintain one or more data objects 275, for example, in one or more data structures. Each of the data objects 275 (e.g., which can be sets of data objects 275, etc.) can be associated with a respective item of media content 270. The data objects can correspond, for example, to one or more renderable elements, in the media content 270. The data objects 275 can be any sort of data extracted from the media content 270 that can be used to populate one or more fields of an application interface 285. The one or more data objects 275 (e.g., a set of data objects 275, etc.) associated with an item of media content 270 can be extracted from the item of media content as described herein. The data objects can include, without limitation, an equation (e.g., an equation extracted from a question or note), a chemical formula, a word in a foreign language (e.g., a verb that can be presented in a conjugation table, etc.), among others. The data objects 275 can be extracted and used by the educational content system 205 to generate the markup data 280, which can be used to populate one or more fields of the application interfaces 285. In some implementations, a provider device 260 can specify one or more of the data objects 275 (e.g., using inputs to a user interface, etc.) when providing an item of media content 270.

The database 215 can store or maintain markup data 280, for example, in one or more data structures. The markup data 280 can be stored in association with a respective item of media content. In some implementations, more than one item of markup data 280 can be associated with an item of media content 270. As described herein, the educational content system 205 can use the data objects 275 to generate one or more items of the markup data 285. The markup data 285 can include one or more tags, such as "entity" tags, "data" tags, "field" tags, "capabilities' tags, "type" tags, and "constraints" tags. The tags can specify information in the markup data. For example, the entity tags can be used to specify parameters for various data objects 275 extracted from an item of media content. The markup data 280 can be hierarchical, and thus certain tags can be embedded within other tags, to provide information about the parent tag. For example, the "field" tags can be used to specify information about an item of data in a "data" tag. Example markup data 280 for plotting a parametric equation of a circle with radius 3 in a space from −10 to 10 is included below.

```
<entity>
    <data>
        <field id = "x">
            3*sin(t)
        </field>
        <field id = "y">
            3*cos(t)
        </field>
    </data>
    <capabilities>
        <type name="plot" parameters="field">
        </type>
        <subtype name="parametric">
    </capabilities>
    <constraints>
        <field id = "x">
            −10,10
        </field>
        <field id = "y">
            −10,10
        </field>
    </constraints>
</entity>
```

The entity tag can be used to describe how one or more of the data objects 275 extracted from an item of media content 270 can be displayed or used in connection with one or more of the application interfaces 285. The entity tag can be a parent tag (e.g., a tag that includes one or more other tags, etc.). In some implementations, the markup data 285 can include multiple entity tags describing how multiple sets of data objects 275 can be used in connection with the application interfaces 285. The <data> tags can be used to specify the set of data objects 275 corresponding to the entity tag. In this example, the data objects 275 in this entity tag can be the equations "3*sin(t)" and "3*cos(t)". The <data> tags can themselves be parent tags. In this example, the data tags include one or more <field> tags that are used to specify modifiers for the data objects 275 specified in the data tag. As shown, the field tags can be used to modify how a data object 275 can be represented when integrated with an application interface 285. In this case, the first <field> tag specifies that the data object 275 "3*sin(t)" can be used to populate a field having an identifier "x", and the second <field> tag specifies that the data object 275 "3*cos(t)" can be used to populate a field having an identifier "y".

The <capabilities> tags can be used to identify the application interfaces 285 that the data objects 275 can be used in connection with. In the example above, the <capabilities> tag specifies a <type> tag and a <subtype> tag. The <type> tag can be used to identify a type of application interface 285 which the data objects 275 can populate in accordance with the <field> tags shown in the <data> tag. In the example above, the <type> tag specifies the equations can be used to populate an application interface 285 with the name "plot," corresponding to a graph plot that can graphically represent the equations. The "parameter" modifier can be used to identify from which tags the data objects 275 in the markup data 280 can be accessed to populate the fields in the application interfaces 285. In the above example, the tags containing the data objects 275 are the "field" tags (e.g., "3*sin(t)" and "3*cos(t)"). The <constraints> tag can be used to specify constraints for the fields specified in the <data> tags. The constraints can be specified, for example, by an educational content provider via the provider device 260. In the above example, the <constraints> tag provides a constraint for the "x" field and a constraint for the "y" field. In each case, the constraint is a range of numerical values, in this case −10 to 10. Although this specific example pertains to a parametric graph, it should be understood that other types of fields, constraints, and data objects 275 are possible. The markup data 280 can be used to specify how the data objects 275 can be integrated into one or more application interfaces 285. The markup data 280 can be generated by the components of the educational content system 205, as described herein. The markup data 280 can thus describe how the data objects 275 in the media content 270 can be presented, and can thus be considered a presentation data structure.

The database 215 can store or maintain one or more application interfaces 285, for example, in one or more data structures. An application interface 285 is sometimes referred to herein as a "gadget". The application interfaces 285 can be computer-readable instructions that cause a user interface to be displayed on a computing device, such as a client device 220. The application interfaces 285 can be used to present teaching information in graphically, or with non-textual content. For example, an application interface 285 can be a calculator, a graph, a simulation (e.g., a physics simulation, etc.), a spreadsheet, a table, or a 3D model, among others. The application interfaces 285 can include instructions that cause actionable objects to appear (e.g., buttons, input fields, etc.), with which the user can interact via a client device 220 to provide additional information (e.g., enter numbers into a calculator, rotate a 3D model, zoom into a graph, etc.). Each application interface 285 can be stored in association with one or more application fields that can be populated with information in the markup data 280. For example, the <field> tags in the <data> tag of an <entity> in the markup data 280 can be used to populate a corresponding application field for an application interface 285. The instructions in the application interface 285 can cause a computing device to parse the markup data 280 associated with an item of media content 270 to populate the application fields of the application interface 285. The application interface 285 can include instructions that cause a client device 220 to display the application interface 285 on top of, or in conjunction with, an information resource (e.g., an item of media content, etc.).

The application interfaces 285 can be integrated with one or more items of media content 270. When an item of media content 270 is displayed, the educational content system 205 can parse the markup data 285 associated with the media content 270 to identify one or more application interfaces 285 that are integrated with the item of media content 270 (e.g., as specified in the <capabilities> tags, etc.). Upon doing so, the educational content system 205 can generate one or more actionable objects (e.g., buttons, links, images, etc.) that correspond to each application interface 285 integrated with the item of media content 270. The educational content system 205 can provide instructions to the client device 220 that cause client device 220 to display the corresponding application interface 285 (e.g., using the instructions in the application interface 285, etc.) upon an interaction with a corresponding actionable object. In some implementations, the application interfaces 285, when displayed, can include one or more actionable objects allowing the user to move, resize, or close an application interface 285 in response to an interaction with the actionable object.

Referring now to the operations of the educational content system 205, the application interface maintainer 230 can maintain one or more application interfaces 285. As described herein above, each application interface 285 can include having one or more application fields for presenting content. The application interfaces 285 can be provided by one or more application interface developers, for example, via the network 210. In some implementations, the application interface maintainer 230 can receive the application interfaces 285 via the network and store the application interfaces 285 in the database 215, for example, as part of an application interface 285 library. The application interface maintainer 230 can store the application interfaces 285 such that they can be queried based on the types of data that can be displayed or used by the application interfaces 285. For example, the application interface maintainer 230 can store the application interfaces 285 such that the application interfaces 285 can be queried by (e.g., the application interfaces 285 can be indexed by, etc.) types of application data fields (e.g., "x", "y", etc.) in the application interfaces 285. In some implementations, the application interfaces 285 can be stored such that the application interfaces 285 can be queried by (e.g., the application interfaces 285 can be indexed by, etc.) other information, such as name, type, or any other information associated with the application interfaces as described herein.

The information resource maintainer 235 can maintain one or more information resources comprising one or more data objects 275. Each of the plurality of data objects can be associated with a content attribute. As described herein, the information resources can be one or more items of the media content 270. Each item of media content 270 can be stored in association with one or more topics of the item of media content 270 and a complexity (or difficulty, etc.) score for the item of media content 270. The information resource maintainer 235 can receive items of media content 270 from external sources via the network 210, such as the provider device 260. The provider device 260 can transmit units of content 270, or one or more fragments (e.g., images, portions of text, videos, audio, etc.) that make up an item of media content 270, in a request to store an item of media content 270 in the database 215. The request can include, for example, a difficulty score for the unit of content 270, one or more topics (e.g., which can be associated with individual fragments of the media content 270, etc.) for the media content 270, among other content metadata. In some implementations, the media content 270 can be provided by the provider device 260 in a request to integrate the media content 270 with one or more application interfaces 285.

In some implementations, the information resource maintainer 235 can transmit instructions (e.g., JavaScript, HTML, other display instructions, etc.) to the provider device 260 that cause the provider device 260 to display a user interface that can accept (e.g., allow a user to provide, etc.) one or more fragments for an item of media content 270. In some implementations, the user interface can accept an entire item of media content 270 from the user (e.g., based on interactions provided at provider device 260, etc.). Upon receiving the fragments or the item of media content 270, the script can cause the provider device 260 to transmit the fragments or the item of media content 270, and any content metadata (e.g., topics, difficulty, etc.), to the information resource maintainer 235 in a request to add the media content 270 to the database 215. Upon receiving the request, the information resource maintainer 235 can store the item of media content 270 in the database 215 in association with any content metadata received in the request. In some implementations, the information resource maintainer 235 can perform semantic analysis on the fragments of the item of media content 270 to identify one or more topics, subjects, or categories for the item of media content 270, and store those as part of the content metadata in association with the item of media content 270. If an entire item of media content 270 was provided, the information resource maintainer 235 can extract one or more fragments (e.g., by modality, portions of text information, etc.), and perform similar semantic analysis on the extracted fragments.

The data object extractor 240 can extract each data object 275 from the information resource (e.g., the item of media content 270, etc.) based on the content attribute of the data object 275. As described herein above, the data objects 275 can be any sort of named entity that is present in the media content, and can include equations, chemical formulas, or other text-based information. The data object extractor 240 can extract each data object 275 by using an entity extraction model on the text content of the media content 270. To do so, the data object extractor 240 can extract the text content from a specified item of media content 270. In some implementations, the data object extractor 240 can construct a single text string from all of the text content in a particular item of media content 270 (e.g., the information resource, etc.). In some implementations, the data object extractor 240 can receive a selection of the item of media content 270, from a provider device 260. As described above, the provider device 260 can make a selection of one or more items of media content 270 using a user interface displayed at the provider device 260. The provider device 260 can make the selection, for example, in a request to integrate one or more of the application interfaces 285 with the item of media content 270.

Upon identifying the specified item of media content 270 and extracting all text content from the item of media content 270, the text content can then be input to the entity extraction model, which can output one or more entities or entity relationships (e.g., entity annotations, etc.). The data object extractor 240 can identify each of the entities in an item of media content 270 that can potentially be used in connection with an application interface 285. In some implementations, the data object extractor 240 can transmit the identified entities extracted from the text content to the provider device 260 for confirmation. For example, in some implementations, the entity extraction model may extract an entity that the user of the provider device 260 is not interested in using in connection with the application interfaces 285.

In some implementations, the data object extractor 240 can provide text information (e.g. candidate data objects 275, etc.) as input to a transformer model. In some implementations, the text content that is identified by the named entity extraction model can be input to the transformer model. The transformer model can encode the positions of the text content, and output to a softmax layer over the potential tags (e.g., field tags, etc.) that can be assigned to different portions of the text content. The transformer model can include multiple softmax layered heads. The transformer model can be trained, for example, over a set of training data including training media content 270 and correct labels (e.g., tags, etc.). The first softmax layer of the transformer model can output the "type" of the input data (e.g., the text content in the media content 270, etc.). This "type" information, along with the text content in the media content 270, can be provided as input to the second layer of the transformer model that can generate the "subtype", "fields", and "constraints" tags for the text content. Thus, the data object extractor 240 can use the transformer model to determine a tag for each data object of the plurality of data objects based on an output from the transformer model. The data object extractor 240 can store the text corresponding to each of the tags generated by the transformer model as the one or more data objects 275 in association with the corresponding item of media content 270. In some implementations, the data object extractor 240 can store the one or more tags corresponding to the data objects 275 in association with the data objects 275 in the media content 270.

In some implementations, once the data object extractor 240 extracts the data objects 275 from the media content 270, the data object extractor 240 can transmit the tags for each data object 275 to the provider device 260 to confirm whether the tag is appropriate for the data object 275 extracted from the media content 270. The tag, and the corresponding data object 275 (e.g., the text in the media content 270), can be displayed in one or more user interfaces on the display of the provider device 260. A user of the provider device 260 can provide an input (e.g., an interaction, etc.) with one or more actionable objects corresponding to whether the tag is appropriate for the data object 275, which can cause the provider device 260 to transmit approval of the tag to the educational content system 205. In some implementations, the user can provide input to the provider device 260 to specify an updated or replacement tag for the extracted data object 275, and transmit the replacement data object in the message to the educational content system. The data object extractor 240 can receive the confirmation of the tag, or the selection of the updated tag in the message. If the tag is a replacement tag, the data object extractor 240 can replace the tag for the data object 275 with the updated tag received from the provider device 260 (e.g., by storing an association between the updated tag and the data object 275, etc.). Likewise, the data object extractor 240 can update, or train, the transformer model based on the feedback message (e.g., confirming whether the tag is or is not appropriate for the data object 275, etc.) received from the provider device 260 received from the provider device.

Once the data objects 275 have been extracted from the media content, the presentation data structure generator 245 can generate a presentation data structure (e.g., the markup data 280, etc.) for the media content 270 using the data objects 275 extracted from the media content. As described herein above, the markup data 280 can include one or more tags, some of which can be fields. To generate the markup data 280, the presentation data structure generator 245 can iterate through each extracted data object 275 and identify each of the tags associated with the data object 275 that were generated by the transformer model. For each data object 275, the presentation data structure generator 245 can assemble each of the tags within a <data> tag of an <entity> tag corresponding to the media content 270. In some implementations, if the transformer model outputs an association between two or more data objects 275, the presentation data structure generator 245 can combine the tags for each associated data object 275 in a single <data> tag.

In some implementations, the presentation data structure generator 245 can select a field type, or modifier, for each data object 275 based on the tag associated with the data object 275. For example, in some implementations, the presentation data structure generator 245 can input each tag, as well as the data object 275, into a deep-neural network having a softmax output over specific tag types. From the softmax output, the presentation data structure generator 245 can select the specific tag associated with the largest output position. For example, the tag type could be the tag identifier "x", which can correspond to an x-axis for a plot application interface 285. In some implementations, the softmax output can indicate the "type" tag for an application interface 285, or the "subtype" field for an application interface 285. An example output from the presentation data structure generator 245 is included below, which is generated from a text passage including equations for plotting a parametric equation of a circle with radius 3:

```
<entity>
    <data>
        <field id = "x">
            3*sin(t)
        </field>
        <field id = "y">
            3*cos(t)
        </field>
    </data>
    <capabilities>
        <type name="plot" parameters="field">
        </type>
        <subtype name="parametric">
    </capabilities>
</entity>
```

As shown, the presentation data structure generator 245 can generate the markup data 280 for the data object by assembling each tag or field for the data object 275 inside of a <data> tag. The specific field type (e.g., the identifier modifier, etc.) can be selected as described herein above, and used to populate the field tags for each data object 275. The data objects 275 can be used to populate the corresponding field tags in the markup data 280. Once the markup data 280 has been generated for a data object 275, the markup data 280 can be stored in association with the data object 275 and the media content 270 in the database 215.

Similar to the feedback described herein above, the presentation data structure generator 245 can transmit the markup language, or the specific field types for each data object 275, to the provider device 260 for confirmation (e.g., approval, confirmation of correctness, etc.). The provider device 260 can transmit a modification (e.g., a change input into one or more user interfaces, etc.) to the field types or tags or markup data 280, and the presentation data structure generator 245 can modify the markup data in accordance with the change. In some implementations, the provider device 260 can provide a constraint for one or more fields in the markup data 280 to the presentation data structure generator 245. For example, the provider device 260 can provide a range of values corresponding to a particular field, which can instruct an application interface 285 to only display information for that field within the corresponding range. Other constraints for different types of fields are also possible. When a constraint is received, the presentation data structure generator 245 can add the constraint to the markup data 280 as a constraint tag. Furthering the example above, the markup data 280 for the text passage including equations for plotting a parametric equation of a circle with radius 3, can further be provided with constraints specified by the provider device to only plot from −10 to 10.

```
<entity>
    <data>
        <field id = "x">
            3*sin(t)
        </field>
        <field id = "y">
            3*cos(t)
        </field>
    </data>
    <capabilities>
        <type name="plot" parameters="field">
        </type>
        <subtype name="parametric">
    </capabilities>
    <constraints>
        <field id = "x">
            −10,10
        </field>
        <field id = "y">
            −10,10
        </field>
    </constraints>
</entity>
```

Once all of the data objects 275 have been used to generate corresponding markup data 280, the application interface selector 250 can select an application interface 285 for presentation with the corresponding item of media content 270. As described herein above, the application interfaces 285 can parse the one or more fields of the markup data 280, and populate the application fields of the application interface 285. To select the application interface 285, the application interface selector 250 can perform a query (e.g., a database query over an index value, etc.) over the application fields of the application resources 285 using the field identifiers in the markup data 280. The application fields can correspond to data that can be populated in the instructions of the application resources 285, to cause the application resources 285 to present the information in the media content 275 in the application interface 275. The results of the query identified by the application interface selector 250 are those that correspond to the fields in the markup data 280 associated with one or more data objects 275. In some implementations, if the <type> tags are specified with names of application interfaces 285, the application interface selector 250 can select the application interfaces 285 having names that correspond to the name in the "type" tag. Likewise, if a "subtype" tag is specified, the application interface selector 250 can select the application interfaces 285 that correspond to both the <type> tag and the <subtype> tag.

In some implementations, once one or more application interfaces 285 are selected, the application interface selector 250 can transmit a list of the selected application interfaces 285 to the provider device 260 for final selection. The list of the selected application interfaces 285 can be displayed in one or more user interfaces on the provider device upon receipt, and the one or more user interfaces can include one or more actionable objects corresponding to each item in the list. A user of the provider device 260 can select (e.g., via interactions with actionable objects, etc.) one or more application interfaces 285 to present with the media content 270 for the corresponding data object 275. For example, if multiple plot types were selected (e.g., parametric, linear, quadratic, etc.) for an equation, a user of the provider device can select the desired plot type to display the equation. In some implementations, the user can select multiple application interfaces 285 for the same data object 275. For example, upon generating the markup data 280 for each of the data objects 275, the application interface selector 250 can transmit a list of the data objects (e.g., in a list, annotated in the media content 270, etc.) that can be integrated with one or more application interfaces 285 as described herein. In some implementations, the provider device 260 can provide a selection of a data object 275 from the list of data objects 275 associated with the media content 270, and transmit a response message to the application interface selector 250. The application interface selector 250 can select one or more application interfaces 285, as described above, for the selected data object 285.

Once the application interface selector 250 has selected one or more application interfaces 285 for the data objects 275 of an item of media content 270, the application interface selector 250 can store instructions that reference the selected application interfaces 285 in association with the item of media content 270. The instructions can cause a computing device (e.g., the client device 270) rendering the media content 270 to display one or more actionable objects corresponding to the application interfaces 285 associated with the media content 270. Upon selection with the actionable object 285, the computing device can execute the instructions in the application interface 285, causing the application interface 285 to be displayed at the computing device. In some implementations, the application interface selector 250 can generate modified media content 270 that includes the instructions for the selected application interfaces 285.

The application interface presenter 255 can present the application interface 285 associated with the information resource at a client device 220. For example, a client device 220 can transmit one or more requests for media content 270, for example, for display in an application such as a web browser. As described herein, an item of media content 270 can be a webpage, or content displayed in a webpage, that provides educational content. In some implementations, the request can identify a particular item of media content 270. In response, the application interface presenter 255 can present the media content 270 by transmitting instructions to the client device 220 that cause the client device 220 to render the media content 270 in the web browser or application. As described herein above, if the media content 270 is associated with one or more application interfaces 285, the application interface presenter 255 can transmit instructions that cause the client device 220 to display one or more actionable objects corresponding to the application interfaces 285 associated with the media content 270. Upon selection with the actionable object 285, the client device 220 can execute the instructions in the application interface 285, causing the application interface 285 to be displayed at the client device 220. The instructions can parse the markup data 280 to display the data objects 275 according to the instructions in the application interface 285. For example, the markup data 280 can cause the application interface 285 for a parametric plot to display a parametric plot of a circle with a radius of 3. In addition, the application interface 285 can parse the markup data 280 to present the application interface 285 within the constraints specified by the constraint tags in the markup language 280. Furthering the example above, the markup data 280 can cause the application interface 285 for the parametric plot to display the parametric plot of the circle with the radius of 3, with the "x" and "y" axes limited to the range of −10 to 10.

Figure 3:
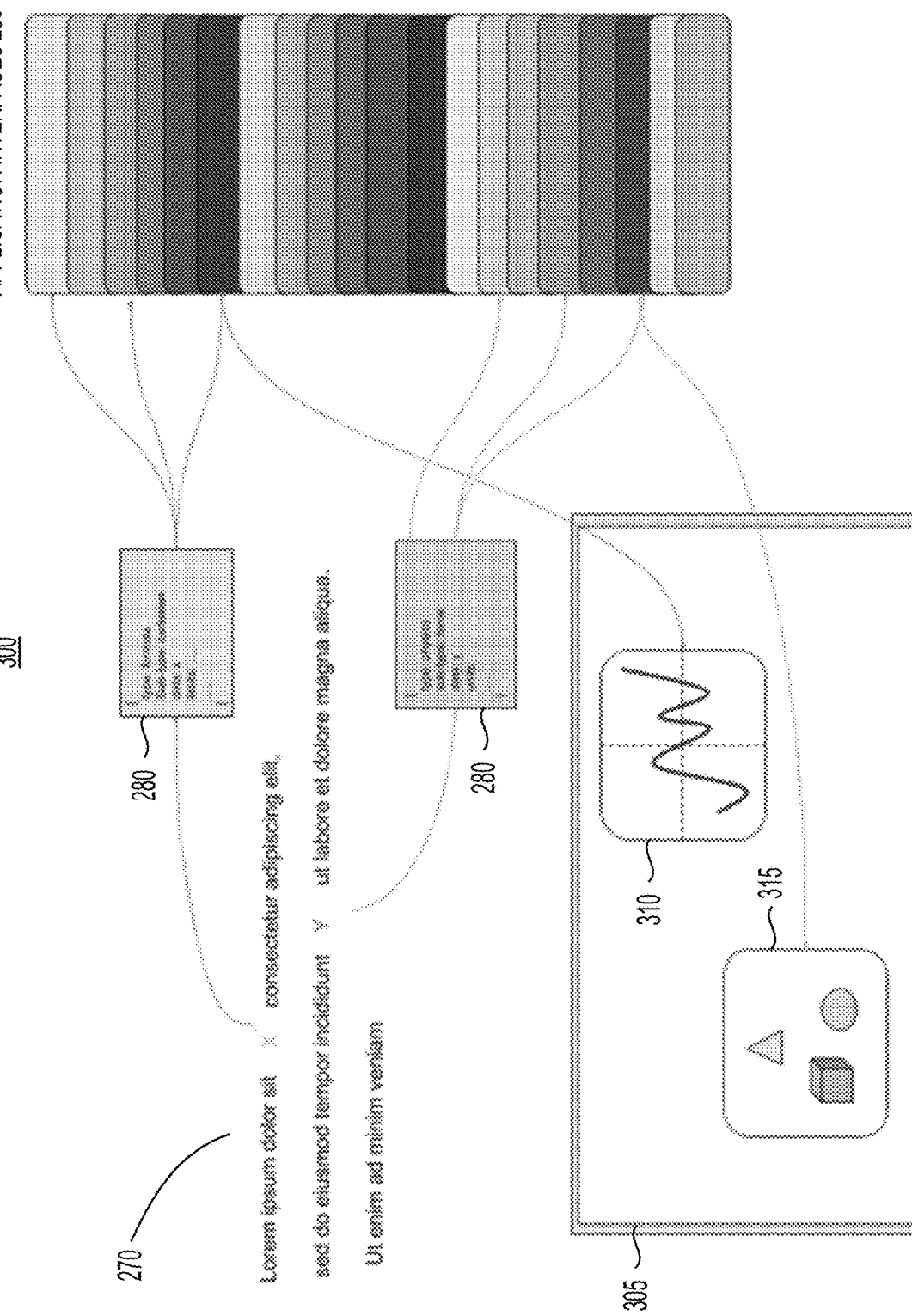
FIG. 3 illustrates an example data flow diagram of presentation gadgets being associated with an item of media content based on the data objects of the item of media content, in accordance with one or more implementations.

Referring now to FIG. 3, illustrated is an example data flow diagram 300 of presentation gadgets (e.g., application interfaces 285, etc.) being associated with a media content 270 based on the data objects 275 of the item of media content 270. As shown, an example item of media content can include text content. The text content can include one or more data objects, which can be annotated using the transformer model described herein to generate the markup data 280 for each data object. The educational content system 285 can map the markup data 280 to one or more of the application interfaces, which can be displayed in connection with the media content 270 in the display 305. As shown, the first data object in the item of media content 270 can correspond to a plot application interface, and thus the plot 310 can be displayed in connection with that data object. Likewise, the second data object can correspond to a second set of application interfaces 280, one of which being a 3D rendering application interface 280. Thus, the 3D render 315 corresponding to the data object can be displayed in connection with the media content 270. As shown, multiple application interfaces 285 can be displayed in connection with the media content 270 simultaneously.

Figure 4:
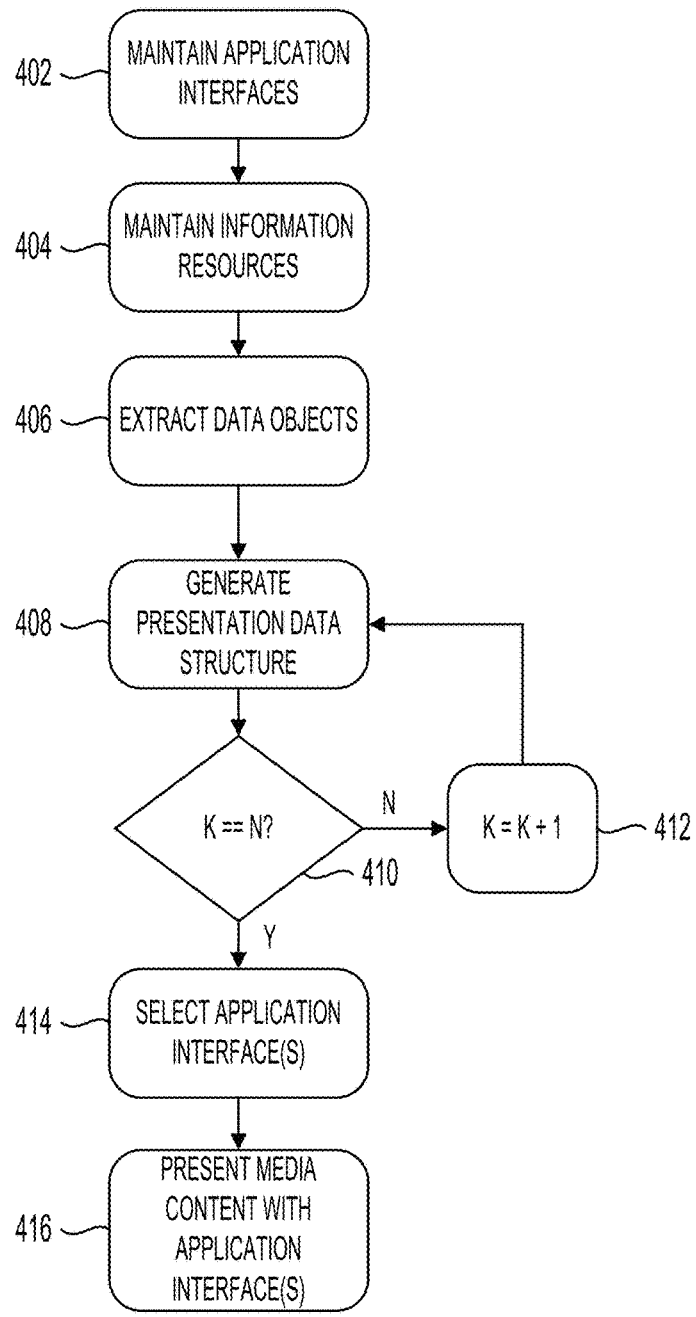
FIG. 4 illustrates an example flow diagram of a method of generating deeply integrated presentation gadgets, in accordance with one or more implementations.

Referring now to FIG. 4, depicted is an illustrative flow diagram of a method 400 for generating deeply integrated presentation gadgets. The method 400 can be executed, performed, or otherwise carried out by the educational content system 205, the computer system 100 described herein in conjunction with FIGS. 1A-1D, or any other computing devices described herein. In brief overview of the method 400, the educational content system (e.g., the educational content system 205, etc.) can maintain application interfaces (STEP 402), maintain information resources (STEP 404), extract data objects (STEP 406), generate a presentation data structure (STEP 408), determine whether the counter register k is equal to the number of data objects n (STEP 410), increment the counter register k (STEP 412), select one or more application interfaces (STEP 412), and present media content with the one or more application interfaces (STEP 414).

In further detail of method 400, the educational content system (e.g., the educational content system 205, etc.) can maintain application interfaces (e.g., the application interfaces 285, etc.) (STEP 402). As described herein above, each application interface can include having one or more application fields for presenting content. The application interfaces can be provided by one or more application interface developers, for example, via a network (e.g., the network 210, etc.). In some implementations, the educational content system can receive the application interfaces via the network and store the application interfaces in a database (e.g., the database 215), for example, as part of an application interface library. The educational content system can store the application interfaces such that they can be queried based on the types of data that can be displayed or used by the application interfaces. For example, the educational content system can store the application interfaces such that the application interfaces can be queried by (e.g., the application interfaces can be indexed by, etc.) types of application data fields (e.g., "x", "y", etc.) in the application interfaces. In some implementations, the application interfaces can be stored such that the application interfaces can be queried by (e.g., the application interfaces can be indexed by, etc.) other information, such as name, type, or any other information associated with the application interfaces as described herein.

The educational content system can maintain information resources (e.g., the media content 270, etc.) (STEP 404). Each item of media content can be stored in association with one or more topics of the item of media content and a complexity (or difficulty, etc.) score for the item of media content. The educational content system can receive items of media content from external sources via the network, such as a provider device (e.g., the provider device, etc.). The provider device can transmit units of content, or one or more fragments (e.g., images, portions of text, videos, audio, etc.) that make up an item of media content, in a request to store an item of media content in the database. The request can include, for example, a difficulty score for the unit of content, one or more topics (e.g., which can be associated with individual fragments of the media content, etc.) for the media content, among other content metadata. In some implementations, the media content can be provided by the provider device in a request to integrate the media content with one or more application interfaces.

In some implementations, the educational content system can transmit instructions (e.g., JavaScript, HTML, other display instructions, etc.) to the provider device that cause the provider device to display a user interface that can accept (e.g., allow a user to provide, etc.) one or more fragments for an item of media content. In some implementations, the user interface can accept an entire item of media content from the user (e.g., based on interactions provided at provider device, etc.). Upon receiving the fragments or the item of media content, the script can cause the provider device to transmit the fragments or the item of media content, and any content metadata (e.g., topics, difficulty, etc.), to the educational content system in a request to add the media content to the database. Upon receiving the request, the educational content system can store the item of media content in the database in association with any content metadata received in the request. In some implementations, the educational content system can perform semantic analysis on the fragments of the item of media content to identify one or more topics, subjects, or categories for the item of media content, and store those as part of the content metadata in association with the item of media content. If an entire item of media content was provided, the educational content system can extract one or more fragments (e.g., by modality, portions of text information, etc.), and perform similar semantic analysis on the extracted fragments.

The educational content system can extract data objects (e.g., the data objects 275, etc.) (STEP 406). The educational content system can extract each data object from the information resource (e.g., the item of media content, etc.) based on the content attribute of the data object. As described herein above, the data objects can be any sort of named entity that is present in the media content, and can include equations, chemical formulas, or other text-based information. The educational content system can extract each data object by using an entity extraction model on the text content of the media content. To do so, the educational content system can extract the text content from a specified item of media content. In some implementations, the educational content system can construct a single text string from all of the text content in a particular item of media content (e.g., the information resource, etc.). In some implementations, the educational content system can receive a selection of the item of media content, from a provider device. As described above, the provider device can make a selection of one or more items of media content using a user interface displayed at the provider device. The provider device can make the selection, for example, in a request to integrate one or more of the application interfaces with the item of media content.

Upon identifying the specified item of media content and extracting all text content from the item of media content, the text content can then be input to the entity extraction model, which can output one or more entities or entity relationships (e.g., entity annotations, etc.). The educational content system can identify each of the entities in an item of media content that can potentially be used in connection with an application interface. In some implementations, the educational content system can transmit the identified entities extracted from the text content to the provider device for confirmation. For example, in some implementations, the entity extraction model may extract an entity that the user of the provider device is not interested in using in connection with the application interfaces.

In some implementations, the educational content system can provide text information (e.g. candidate data objects, etc.) as input to a transformer model. In some implementations, the text content that is identified by the named entity extraction model can be input to the transformer model. The transformer model can encode the positions of the text content, and output to a softmax layer over the potential tags (e.g., field tags, etc.) that can be assigned to different portions of the text content. The transformer model can include multiple softmax layered heads. The transformer model can be trained, for example, over a set of training data including training media content and correct labels (e.g., tags, etc.). The first softmax layer of the transformer model can output the "type" of the input data (e.g., the text content in the media content, etc.). This "type" information, along with the text content in the media content, can be provided as input to the second layer of the transformer model that can generate the "subtype", "fields", and "constraints" tags for the text content. Thus, the educational content system can use the transformer model to determine a tag for each data object of the plurality of data objects based on an output from the transformer model. The educational content system can store the text corresponding to each of the tags generated by the transformer model as the one or more data objects in association with the corresponding item of media content. In some implementations, the educational content system can store the one or more tags corresponding to the data objects in association with the data objects in the media content.

In some implementations, once the educational content system extracts the data objects from the media content, the educational content system can transmit the tags for each data object to the provider device to confirm whether the tag is appropriate for the data object extracted from the media content. The tag, and the corresponding data object (e.g., the text in the media content), can be displayed in one or more user interfaces on the display of the provider device. A user of the provider device can provide an input (e.g., an interaction, etc.) with one or more actionable objects corresponding to whether the tag is appropriate for the data object, which can cause the provider device to transmit approval of the tag to the educational content system 205. In some implementations, the user can provide input to the provider device to specify an updated or replacement tag for the extracted data object, and transmit the replacement data object in the message to the educational content system. The educational content system can receive the confirmation of the tag, or the selection of the updated tag in the message. If the tag is a replacement tag, the educational content system can replace the tag for the data object with the updated tag received from the provider device (e.g., by storing an association between the updated tag and the data object, etc.). Likewise, the educational content system can update, or train, the transformer model based on the feedback message (e.g., confirming whether the tag is or is not appropriate for the data object, etc.) received from the provider device received from the provider device.

The educational content system can generate a presentation data structure (e.g., the markup data 280, etc.) (STEP 408). The markup data can include one or more tags, some of which can be fields. To generate the markup data, the educational content system can iterate through each extracted data object and identify each of the tags associated with the data object that were generated by the transformer model. For each data object, the educational content system can assemble each of the tags within a <data> tag of an <entity> tag corresponding to the media content. In some implementations, if the transformer model outputs an association between two or more data objects, the educational content system can combine the tags for each associated data object in a single <data> tag.

In some implementations, the educational content system can select a field type, or modifier, for each data object based on the tag associated with the data object. For example, in some implementations, the educational content system can input each tag, as well as the data object, into a deep-neural network having a softmax output over specific tag types. From the softmax output, the educational content system can select the specific tag associated with the largest output position. For example, the tag type could be the tag identifier "x", which can correspond to an x-axis for a plot application interface. In some implementations, the softmax output can indicate the "type" tag for an application interface, or the "subtype" field for an application interface. An example output from the educational content system is included below, which is generated from a text passage including equations for plotting a parametric equation of a circle with radius 3:

```
<entity>
    <data>
        <field id = "x">
            3*sin(t)
        </field>
        <field id = "y">
            3*cos(t)
        </field>
    </data>
    <capabilities>
        <type name="plot" parameters="field">
        </type>
        <subtype name="parametric">
    </capabilities>
</entity>
```

As shown, the educational content system can generate the markup data for the data object by assembling each tag or field for the data object inside of a <data> tag. The specific field type (e.g., the identifier modifier, etc.) can be selected as described herein above, and used to populate the field tags for each data object. The data objects can be used to populate the corresponding field tags in the markup data. Once the markup data has been generated for a data object, the markup data can be stored in association with the data object and the media content in the database.

Similar to the feedback described herein above, the educational content system can transmit the markup language, or the specific field types for each data object, to the provider device for confirmation (e.g., approval, confirmation of correctness, etc.). The provider device can transmit a modification (e.g., a change input into one or more user interfaces, etc.) to the field types or tags or markup data, and the educational content system can modify the markup data in accordance with the change. In some implementations, the provider device can provide a constraint for one or more fields in the markup data to the educational content system. For example, the provider device can provide a range of values corresponding to a particular field, which can instruct an application interface to only display information for that field within the corresponding range. Other constraints for different types of fields are also possible. When a constraint is received, the educational content system can add the constraint to the markup data as a constraint tag. Furthering the example above, the markup data for the text passage including equations for plotting a parametric equation of a circle with radius 3, can further be provided with constraints specified by the provider device to only plot from −10 to 10.

```
<entity>
    <data>
        <field id = "x">
            3*sin(t)
        </field>
        <field id = "y">
            3*cos(t)
        </field>
    </data>
    <capabilities>
        <type name="plot" parameters="field">
        </type>
        <subtype name="parametric">
    </capabilities>
    <constraints>
        <field id = "x">
            −10,10
        </field>
        <field id = "y">
            −10,10
        </field>
    </constraints>
</entity>
```

The educational content system can determine whether the counter register k is equal to the number of data objects n (STEP 410). To determine whether markup data has been generated for all the data objects extracted from the media content, the educational content system can compare the counter register k used to track the number of processed data objects to the number of data objects extracted from the media content n. If the counter register k is not equal to (e.g., less than) the total number of data objects extracted from the media content n, the educational content system can execute (STEP 412). If the counter register k is equal to (e.g., equal to or greater than) the total number of data objects extracted from the media content n, the educational content system can execute (STEP 414).

The educational content system can increment the counter register k (STEP 410). To track the total number of data objects from which markup data has been generated, the educational content system can add one to the counter register k to indicate the number of processed data objects extracted from the media content. After incrementing the value of the counter register k, the educational content system can execute (STEP 408).

The educational content system can select one or more application interfaces (STEP 412). To select the application interface, the educational content system can perform a query (e.g., a database query over an index value, etc.) over the application fields of the application resources using the field identifiers in the markup data. The application fields can correspond to data that can be populated in the instructions of the application resources, to cause the application resources to present the information in the media content in the application interface. The results of the query identified by the educational content system are those that correspond to the fields in the markup data associated with one or more data objects. In some implementations, if the <type> tags are specified with names of application interfaces, the educational content system can select the application interfaces having names that correspond to the name in the "type" tag. Likewise, if a "subtype" tag is specified, the educational content system can select the application interfaces that correspond to both the <type> tag and the <subtype> tag.

In some implementations, once one or more application interfaces are selected, the educational content system can transmit a list of the selected application interfaces to the provider device for final selection. The list of the selected application interfaces can be displayed in one or more user interfaces on the provider device upon receipt, and the one or more user interfaces can include one or more actionable objects corresponding to each item in the list. A user of the provider device can select (e.g., via interactions with actionable objects, etc.) one or more application interfaces to present with the media content for the corresponding data object. For example, if multiple plot types were selected (e.g., parametric, linear, quadratic, etc.) for an equation, a user of the provider device can select the desired plot type to display the equation. In some implementations, the user can select multiple application interfaces for the same data object. For example, upon generating the markup data for each of the data objects, the educational content system can transmit a list of the data objects (e.g., in a list, annotated in the media content, etc.) that can be integrated with one or more application interfaces as described herein. In some implementations, the provider device can provide a selection of a data object from the list of data objects associated with the media content, and transmit a response message to the educational content system. The educational content system can select one or more application interfaces, as described above, for the selected data object.

Once the educational content system has selected one or more application interfaces for the data objects of an item of media content, the educational content system can store instructions that reference the selected application interfaces in association with the item of media content. The instructions can cause a computing device (e.g., the client device) rendering the media content to display one or more actionable objects corresponding to the application interfaces associated with the media content. Upon selection with the actionable object, the computing device can execute the instructions in the application interface, causing the application interface to be displayed at the computing device. In some implementations, the educational content system can generate modified media content that includes the instructions for the selected application interfaces.

The educational content system can present media content with the one or more application interfaces (STEP 414). The educational content system can present the application interface 285 associated with the information resource at a client device (e.g., a client device 220, etc.). For example, a client device can transmit one or more requests for media content, for example, for display in an application such as a web browser. As described herein, an item of media content can be a webpage, or content displayed in a webpage, that provides educational content. In some implementations, the request can identify a particular item of media content. In response, the educational content system can present the media content by transmitting instructions to the client device that cause the client device to render the media content in the web browser or application. As described herein above, if the media content is associated with one or more application interfaces, the educational content system can transmit instructions that cause the client device to display one or more actionable objects corresponding to the application interfaces associated with the media content. Upon selection with the actionable object, the client device can execute the instructions in the application interface, causing the application interface to be displayed at the client device. The instructions can parse the markup data to display the data objects according to the instructions in the application interface. For example, the markup data can cause the application interface for a parametric plot to display a parametric plot of a circle with a radius of 3. In addition, the application interface can parse the markup data to present the application interface within the constraints specified by the constraint tags in the markup language. Furthering the example above, the markup data can cause the application interface for the parametric plot to display the parametric plot of the circle with the radius of 3, with the "x" and "y" axes limited to the range of −10 to 10.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating deeply integrated presentation gadgets, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method of generating deeply integrated presentation gadgets, comprising:

maintaining, by one or more processors coupled to memory, a plurality of application interfaces each having one or more data fields for presenting content;

maintaining, by the one or more processors, an information resource comprising a plurality of data objects, each of the plurality of data objects having a content attribute;

providing, by the one or more processors, the plurality of data objects as input to a transformer model;

determining, by the one or more processors, a tag for each data object of the plurality of data objects based on an output from the transformer model;

transmitting, by the one or more processors, the tag for at least one data object to a provider device;

receiving, by the one or more processors from the provider device, a selection of an updated tag for the at least one data object;

replacing, by the one or more processors, the determined tag for the at least one data object with the updated tag received from the provider device;

generating, by the one or more processors, a presentation data structure for the information resource based on the plurality of data objects extracted from the information resource, the presentation data structure comprising one or more fields, the one or more fields based on either a corresponding determined tag or an updated tag, if the corresponding determined tag was replaced;

selecting, by the one or more processors, based on the presentation data structure, an application interface from the plurality of application interfaces for presentation with the information resource, the application interface configured to parse the one or more fields of the presentation data structure and populate the one or more data fields of the application interface; and presenting, by the one or more processors, the application interface with the information resource at a client device based on the one or more data fields of the application interface.

2. The method of claim 1, wherein maintaining the information resource further comprises:
receiving, by the one or more processors from a provider computing device, the information resource; and
storing, by the one or more processors, the information resource in a database for retrieval.

3. The method of claim 1, further comprising receiving, by the one or more processors from a provider device, a constraint for the one or more data fields of the application interface; and
wherein presenting the application interface with the information resource at the client device is further based on the constraint received from the provider device.

4. The method of claim 1, wherein generating the presentation data structure for the information resource further comprises:
selecting, by the one or more processors, a field type for a data object of the plurality of data objects based on the determined tag or updated tag associated with the data object;
generating, by the one or more processors, the presentation data structure to include a field having the field type in the one or more fields of the presentation data structure; and
populating, by the one or more processors, the field having the field type based on the data object of the plurality of data objects.

5. The method of claim 1, further comprising updating the transformer model based on the selection of the updated tag received from the provider device.

6. The method of claim 1, wherein selecting the application interface of the plurality of application interfaces further comprises:
receiving, by the one or more processors, a selection of a data object of the information resource from the client device presenting the information resource; and
selecting, by the one or more processors, the application interface based on the one or more fields in the presentation data structure associated with the data object.

7. The method of claim 1, wherein selecting the application interface of the plurality of application interfaces further comprises receiving a selection of the application interface from a provider device, the selection indicating a request to present the application interface with the information resource.

8. The method of claim 1, wherein presenting the application interface with the information resource at the client device further comprises:
presenting, by the one or more processors, the information resource at the client device in response to a request for the information resource, wherein the information resource comprises an actionable object;
detecting, by the one or more processors, an interaction with the actionable object presented as part of the information resource; and
presenting, by the one or more processors, the application interface in response to the interaction with the actionable object.

9. A system for generating deeply integrated presentation gadgets, comprising:
one or more processors coupled to memory, the one or more processors configured to:
maintain a plurality of application interfaces each having one or more data fields for presenting content;
maintain an information resource comprising a plurality of data objects, each of the plurality of data objects having a content attribute;
provide the plurality of data objects as input to a transformer model;
determine a tag for each data object of the plurality of data objects based on an output from the transformer model;
transmit the tag for at least one data object to a provider device;
receive, from the provider device, a selection of an updated tag for the at least one data object;
replace the determined tag for the at least one data object with the updated tag received from the provider device;
generate a presentation data structure for the information resource based on the plurality of data objects extracted from the information resource, the presentation data structure comprising one or more fields, the one or more fields based on either a corresponding determined tag or an updated tag, if the corresponding determined tag was replaced;
select, based on the presentation data structure, an application interface from the plurality of application interfaces for presentation with the information resource, the application interface configured to parse the one or more fields of the presentation data structure and populate the one or more data fields of the application interface; and
present the application interface with the information resource at a client device based on the one or more data fields of the application interface.

10. The system of claim 9, wherein the one or more processors are further configured to maintain the information resource by:
receiving, from a provider computing device, the information resource; and
storing the information resource in a database for retrieval.

11. The system of claim 9, wherein the one or more processors are further configured to receive, from a provider device, a constraint for the one or more data fields of the application interface; and
wherein the one or more processors are further configured to present the application interface with the information resource at the client device further based on the constraint received from the provider device.

12. The system of claim 9, wherein the one or more processors are further configured to generate the presentation data structure for the information resource by:
selecting a field type for a data object of the plurality of data objects based on the determined tag or updated tag associated with the data object;
generating the presentation data structure to include a field having the field type in the one or more fields of the presentation data structure; and
populating the field having the field type based on the data object of the plurality of data objects.

13. The system of claim 9, further comprising updating the transformer model based on the selection of the updated tag received from the provider device.

14. The system of claim 9, wherein the one or more processors are further configured to select the application interface of the plurality of application interfaces by:
- receiving a selection of a data object of the information resource from the client device presenting the information resource; and
- selecting the application interface based on the one or more fields in the presentation data structure associated with the data object.

15. The system of claim 9, wherein the one or more processors are further configured to select the application interface of the plurality of application interfaces by receiving a selection of the application interface from a provider device, the selection indicating a request to present the application interface with the information resource.

16. The system of claim 9, wherein the one or more processors are further configured to present the application interface with the information resource at the client device by:
- presenting the information resource at the client device in response to a request for the information resource, wherein the information resource comprises an actionable object;
- detecting an interaction with the actionable object presented as part of the information resource; and
- presenting the application interface in response to the interaction with the actionable object.

17. A non-transitory computer readable medium comprising instructions that, when executed by one or more processors of a computing system, cause the computing system to:
- maintain a plurality of application interfaces each having one or more data fields for presenting content;
- maintain an information resource comprising a plurality of data objects, each of the plurality of data objects having a content attribute;
- provide the plurality of data objects as input to a transformer model;
- determine a tag for each data object of the plurality of data objects based on an output from the transformer model;
- transmit the tag for at least one data object to a provider device;
- receive, from the provider device, a selection of an updated tag for the at least one data object;
- replace the determined tag for the at least one data object with the updated tag received from the provider device;
- generate a presentation data structure for the information resource based on the plurality of data objects extracted from the information resource, the presentation data structure comprising one or more fields, the one or more fields based on either a corresponding determined tag or an updated tag, if the corresponding determined tag was replaced;
- select, based on the presentation data structure, an application interface from the plurality of application interfaces for presentation with the information resource, the application interface configured to parse the one or more fields of the presentation data structure and populate the one or more data fields of the application interface; and
- present the application interface with the information resource at a client device based on the one or more data fields of the application interface.

* * * * *